United States Patent [19]

Yamamoto et al.

[11] Patent Number: 5,138,697
[45] Date of Patent: Aug. 11, 1992

[54] GRAPHIC DATA CONVERSION METHOD

[75] Inventors: Yoshiyuki Yamamoto, Tokyo; Yoshimitsu Murahashi, Kitakyusyu, both of Japan

[73] Assignee: Nippon Steel Corporation, Tokyo, Japan

[21] Appl. No.: 760,820

[22] Filed: Sep. 17, 1991

Related U.S. Application Data

[63] Continuation of Ser. No. 397,467, filed as PCT JP88/01345 on Dec. 28, 1988, abandoned.

[30] Foreign Application Priority Data

Dec. 29, 1987 [JP] Japan .................... 62-333976

[51] Int. Cl.$^5$ ............................ G06F 15/60
[52] U.S. Cl. ............................ 395/120; 395/141
[58] Field of Search .................. 395/120, 124, 141

[56] References Cited

U.S. PATENT DOCUMENTS

| | | | |
|---|---|---|---|
| 4,559,614 | 12/1985 | Peek et al. | 364/900 |
| 4,604,710 | 8/1986 | Amerzcua et al. | 364/900 |
| 4,736,306 | 4/1988 | Christensen et al. | 364/522 |
| 4,754,428 | 6/1988 | Schultz et al. | 364/900 |
| 4,858,149 | 8/1989 | Quarendon | 364/522 |
| 4,868,766 | 9/1989 | Oosterholt | 364/522 |
| 4,897,799 | 1/1990 | Le Gall et al. | 364/518 X |

OTHER PUBLICATIONS

Yamamoto et al., "Method for Exchanging Drawing Data Between Different CAD/CAM Systems", Nippon Steel Technical Report No. 44, Jan. 1990, pp. 59-65.

Primary Examiner—Gary V. Harkcom
Assistant Examiner—Michael A. Jaffe
Attorney, Agent, or Firm—Spencer, Frank & Schneider

[57] ABSTRACT

A graphic data conversion method converts the original data of a first format of a drawing or a product into basic element records comprising basic graphic elements, dimension line elements and text elements, organizes an intermediate data file by properly inserting edit partition records and edit records, and then converts the data stored in the intermediate data file into the data of a second format of the drawing or the product. Translators can be easily organized and the degree of freedom and efficiency of data conversion are enhanced, since the data is stored perspicuously in the intermediate data file in elements and structures.

8 Claims, 7 Drawing Sheets

GRAPHIC DATA CONVERSION METHOD

This application is a continuation of application Ser. No. 07/397,467, filed Aug. 18th, 1989, now abandoned, which is a National Stage application of P.C.T. application Ser. No. PCT/JP88/01345, filed Dec. 28th, 1988.

TECHNICAL FIELD

The present invention relates to a graphic data conversion method for converting graphic or product data organized by a first graphic data processing system of a first form into graphic or product data capable of being processed by another graphic data processing system of a second form to use the graphic or product data organized by the first graphic data processing system by the second graphic data processing system.

BACKGROUND ART

Need of data exchange between different graphic data processing systems, such as CAD systems or CAM systems, has increased with the spread of CAD systems, CAM systems and computerized communications brought about by the development of personal computers. The efficiency of data conversion must be enhanced to promote data exchange, because graphic data processing systems are practiced in diversified forms.

Generally, the conventional graphic data conversion method exchanges graphic data indirectly between different graphic data processing systems through an intermediate data file, in which graphic data of one of the associated graphic data processing systems is translated into an intermediate data file, and then the intermediate data file is translated into graphic data capable of being processed by the other graphic data processing system.

Such a conventional graphic data conversion method employs an intermediate data file specified in IGES (Initial Graphics Exchange Specification) of the ANSI Standards or other intermediate data file. Since priority is given to flexibility in designing the data file format of IGES, a series of CAD/CAM records and data is divided into sections. That is, the connection of the divided CAD/CAM data can be expressed only by means of pointers. Accordingly, in converting the CAD/CAM data, the reader must take the trouble to decompose a significant series of records or data into an insignificant series of records or data with pointers. Accordingly, the writer must interpret the significance of the arrangement of a series of records or data after analyzing the pointers to convert the records or data. There will not be any particular problem in such a procedure when the significance of the arrangement of the CAD/CAM records or data is simple, but serious problems arises in such a procedure when the significance of the arrangement of the CAD/CAM records or data is complicatedly hierarchized, and hence accurate data conversion is very difficult. Furthermore, even if the significance of the arrangement is simple, the description of the intermediate data file becomes redundant and a large number of pointers reduces the efficiency of data conversion greatly. Moreover, the intermediate data file of IGES has drawbacks that all the essential elements of CAD/CAM graphic data are not included in the intermediate data file and the ambiguous definition of formats and rules is likely to cause wrong interpretation.

Generally, translators are organized through the data file of IGES in exchanging data between different CAD/CAM systems. However, the functions and quality of the translators vary widely due to the foregoing drawbacks of the intermediate data file of IGES. Thus, the intermediate data file of IGES cannot be the only intermediate data file common to both the different CAD/CAM systems, and hence IGES merely formal standards. Accordingly, in most cases, limited converting functions are defined according to the purpose of conversion, and then an individual intermediate data file is prepared to organize translators.

In either conventional graphic data conversion method, the general applicability and flexibility of the form and rule of the description of the intermediate data file are insufficient, not simple and unperspicuous, and hence it is very difficult to organize a perfect translator. Consequently, the range of conversion is limited and modes of conversion increase in a geometric progression with the increase of the objective different graphic data processing systems or it is impossible to achieve the unrestricted exchange of data connecting graphic forms and their attributes between general-purpose CAD/CAM systems and a series of CAD/CAM systems for automated design, material estimation or production design.

It is an object of the present invention to provide a simple, perspicuous, highly flexible and highly universal graphic data conversion method capable of carrying out unrestricted conversion of graphic data including data connecting graphic forms and their attributes.

SUMMARY OF THE INVENTION

To achieve the aforesaid object, the present invention provides a graphic data conversion method for converting graphic data of a first format of a drawing or a product, organized by a first graphic data processing system into graphic data of a second format different from the first format, comprising steps of: sorting the graphic data of the first format into basic graphic elements, dimension line elements and text elements according to the meaning of the drawing or the product represented by the graphic data of the first format to convert the basic graphic elements, the dimension line elements and the text elements into corresponding basic element records; and converting the basic element records by properly inserting edit partition records respectively representing the drawing or the product, element views of the drawing or the product, general composite graphic forms forming the element views, and predefined registered composite graphic forms, and edit records indicating graphic form insertion, for editing the registered composite graphic forms on each element view, attribute signification for signifying the attributes of the registered composite graphic forms, the general composite graphic forms and the basic graphic form elements, and text insertion for editing the attributes, dimensions and the contents of notes on the drawing, storing the converted graphic data in an intermediate data file, and converting the converted graphic data stored in the intermediate data file into a drawing or product data of the second format.

Although each graphic processing system, each operator or each field has its own expression of graphic data necessary for describing the relation between the specifications of parts and products, and the graphic forms, the essential components of the expression and the construction of the essential components are common to all manner of expression and the apparent difference between the manners of expression is attributable to the diversity in the combination of the components and the structure of the components. Since the format and rules of description of the intermediate data file description consists of necessary and sufficient basic element records for expressing the smallest components of the drawing, and necessary and sufficient edit partition records and edit records to be inserted properly in the basic element records to discretionally partition and edit the basic records according to the expression and construction of the drawing and to express the construction intelligibly, the intermediate data file is able to describe flexibly various drawings formed by various graphic data processing systems. Unrestricted description is possible even if the data is hierarchical or the data includes attributes. Since data for application specially to a batch type job, such as automated design, material estimation or manufacture design, in particular, originally consists of graphic data of a series of significant forms and rules, and data of their attributes, such data can be stored in the intermediate data file. That is, data organized by any graphic data processing system can be stored in the intermediate data file.

Futhermore, since drawing data to be stored in the intermediate data file is converted after being decomposed into elements and being formed in a structure by properly inserting, in basic element records obtained by sorting the data of the original drawing in basic graphic elements, dimension line elements and text elements, edit partition records sorted in drawings, element drawings, general composite forms and registered composite forms according to the diagrammatical meanings of the basic element records, and edit records expressing drawing insertion for disposing registered graphic forms on the drawing, attribute signification and text insertion for disposing the attributes, dimensions and notes on the drawing, the specifications and construction of the drawing data can readily be understood from the list of those records. That is, the data stored in the intermediate data file is formed in a readily intelligible expression and a construction equal to the detailed specification of the drawing.

Thus, since the description format and rule of the intermediate data file are simple and perspicuous in addition to being universal and flexible, the graphic data of a drawing organized by an original graphic data processing system can be converted into data capable of being stored in the intermediate data file without any particular difficulty, and the contents of the intermediate data file need not be interpreted again in converting the data stored in the intermediate data file into data capable of being processed by an associated graphic data processing system. Accordingly, the function and quality of the translator can easily be improved, and the conversion efficiency is improved greatly since pointers are not needed. Thus, according to the present invention, since the description format and rule of the intermediate data file is universal, flexible, simple and perspicuous, translators can be organized through the intermediate data file in common to various graphic data processing systems, and unrestricted data conversion is possible between different graphic data processing systems simply by organizing a set of bilateral translators for each graghic data processing system. Accordingly, the present invention enhances the degree of freedom and efficiency of data conversion remarkably. Consequently, the data for a graphic data processing application specific to a job can be held independently of a general-purpose graphic data processing system.

BEST MODE FOR CARRYING OUT THE INVENTION

Data to be stored in an intermediate data file comprises element records of minimum units necessary and sufficient for describing the contents of a drawing regardless of the function of a CAD/CAM system, and the element records are expressed in a construction.

That is, the intermediate data file consists of basic element records, edit partition records and edit records. These records are each written in a single line or a plurality of successive lines depending on the quantity of data relating to each record.

As shown in Table 1, the basic element record consists of basic graphic elements, dimension line elements and text elements.

TABLE 1

1) BASIC GRAPHIC ELEMENT RECORDS
| | | | |
|---|---|---|---|
| 1. POINT: | Point | 2. LINE: | Line |
| 3. CIRCLE: | Circle | 4. ARC: | Circular arc |
| 5. ELLIP: | Ellipse | 6. ELLIPA: | Elliptic arc |
| 7. PLINE: | Polyline | | |

2) DIMENSION LINE ELEMENT RECORDS
| | | |
|---|---|---|
| DIM | DIMHOR: | Horizontal dimension line |
| | DIMVER: | Vertical dimension line |
| | DIMALI: | Parallel dimension line |
| | DIMANG: | Dimensioning angle |
| | DIMDIA: | Dimensioning diameter |
| | DIMRAD: | Dimensioning radius |
| | DIMROT: | Dimensioning specified angle |
| | DIMLEA: | Dimensioning leader line |

3) TEXT ELEMENT RECORDS
| | |
|---|---|
| TD: | Character string consisting of digits, Kanjis, Katakanas, and/or Hiraganas |

Each element record has indication control data including layer, color, kind of line, quality of line, width of line and line scale, and all the graphic data of the basic graphic element record are processed in an actual image instead of expressing by functions to avoid troubles in processing the graphic data in an imaginary image expressed by functions, and to secure a sufficient degree of freedom. As regards the basic graphic elements, the accuracy of approximate conversion is improved by adding curve fit data to the data of straight lines between the peaks of polyline graphic forms and circular arcs in view of conversion of curves of higher order and graphic forms, such as ellipses and free curved lines, without using functions.

As shown in Table 1, records of seven types corresponding to the respective characteristics of essential graphic form elements including simple points and free polylines formed by connecting a plurality of optional points by optional curve fit information to cover all kinds of shapes. Each basic element record includes data representing the thickness or height of each graphic form element to enable the recognition of a 2.5-dimensional physical graphic form.

The dimension line element record of a single type is designed so as to be able to deal with dimension line element graphic forms of various types as shown in Table 1.

The text element record includes data expressed by character strings representing notes, attributes and dimensions. The text element record is recognized in front data of two bytes.

The edit partition record and the edit record are used for editing the basic element records decomposed into elements in significant drawing data.

As shown in Table 2, the edit partition record includes a drawing partition record, a registered composite graphic form partition record, an element graphic form partition record and a general composite graphic form partition record.

The edit partition record has records respectively indicating the start and end of a partition and recognizes records in the partition between the records as a set of data to express the hierarchy and construction of the data intelligibly. A drawing includes a plurality of registered composite graphic forms and a plurality of unit graphic forms or element views. However, only the data of the element views are regarded as drawing data, and the registered composite graphic forms are merely graphic forms used repeatedly in element views, and hence the data of the element views do not construct an actual drawing before the same is disposed in the element view by the following graphic form insertion procedure. General composite graphic forms are composite graphic forms to be defined for each element view.

The edit record includes a graphic form insertion record, an attribute signification record and a text insertion record as shown in Table 2. These records indicate the edit contents of a drawing. The graphic form insertion record has, as mentioned above, data for disposing a registered composite graphic form which is defined and registered beforehand at a specified position in a specified element view. When necessary, a registered composite graphic form is inserted optionally in another registered composite graphic form for hierarchical expression. The registered composite graphic forms and graphic form insertion serves as means for carrying out the conversion of data representing a series of related graphic forms and for compressing data in repeatedly using the same graphic forms for data conversion.

TABLE 2

1) EDIT PARTITION RECORD
1. Drawing Partition
   SDWG: One drawing start header
   EDWG: One drawing end header
2. Registered Composite Graphic Form Partition
   SBLOCK: One registered composite graphic form start header
   EBLOCK: One registered composite graphic form end header
3. Element View Partition
   SVIEW: One element view start header
   EVIEW: One element view end header
4. General Composite Graphic Form Partition
   SGROUP: One general composite graphic form start header
   EGROUP: One composite graphic form end header 2) EDIT RECORD
1. Graphic Form Insertion Record
   INSERT: Record for disposing registered composite graphic forms on a drawing, including data indicating registered composite graphic form operations, such as inversion, rotation and stretch
2. Attribute Indication Record
   ATTR: Attribute header
3. Text Insertion Record
   TEXT: Record for disposing text on a drawing, having data representing the size of character strings and the arrangement of character strings As regards notes, dimensions and attributes, the text element record is placed just behind the text insertion record to express the layout of optional text strings on a drawing. The attribute indication record is placed just behind an optional record or records, and the element record is placed just behind the attribute indication record to express the attributes of optional graphic forms. The additional placement of the text insertion record just behind the attribute indication record provides the layout of the attributes on the drawing.

The graphic form elements and dimensions are expressed by the text insertion record and the text element records placed just behind the dimension line element record or records, the basic graphic element record or records, or the graphic form insertion record or records.

Various combinations of graphic form data, such as graphic forms, notes, dimensions and attributes, can be hierarchized optionally and can be efficiently and intelligibly described in relation with graphic forms by using the basic element record, the edit partition record and the edit record. Accordingly, the relation between the graphic form and characteristics of a graphic form can be unrestrictedly described. Thus, the records of the intermediate data file and the construction of the same are designed elaborately so that all the contents of a drawing can be expressed in a structural expression.

Figure 1:
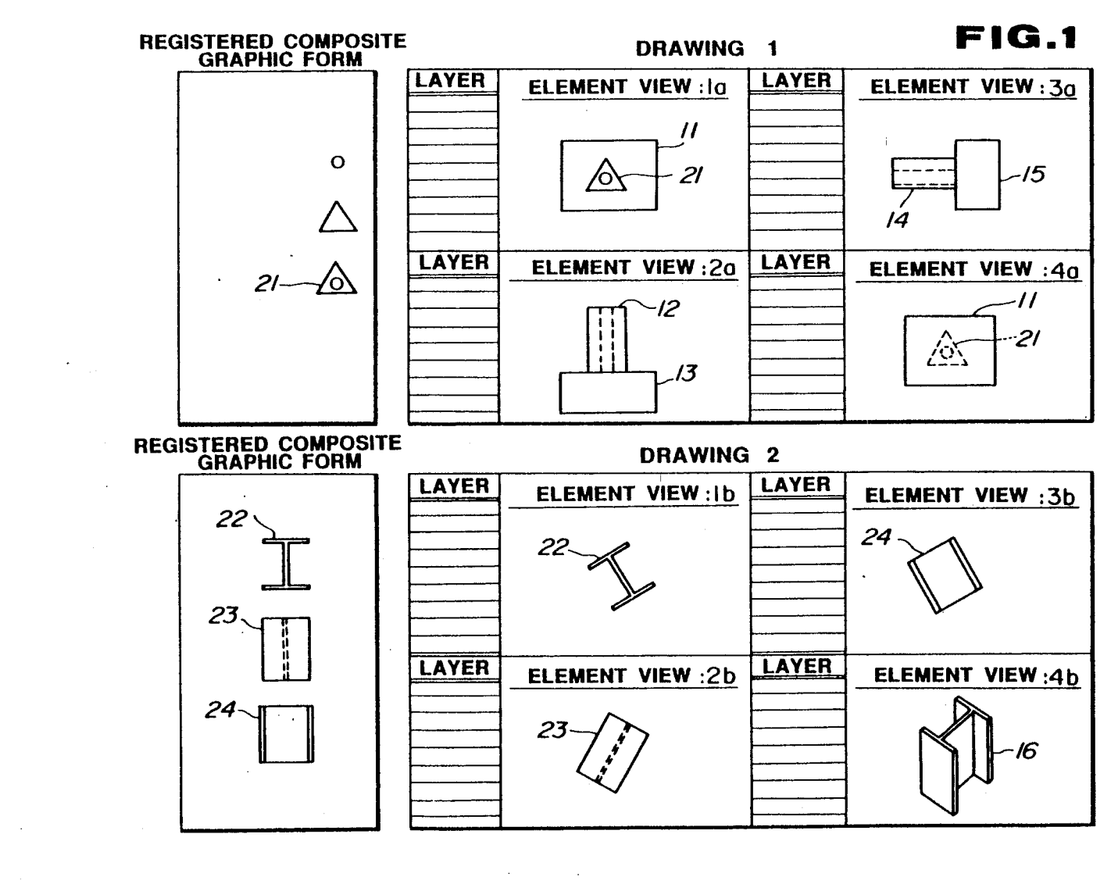
FIG. 1 is a illustration showing the contents of typical drawing data forming an intermediate data file by a graphic data conversion method in a first embodiment according to the present invention.

Examples of the construction and constitution of the records for organizing an intermediate data file are shown in Table 3. Shown in FIG. 1 are typical illustrations of the construction and constitution.

TABLE 3

Example of intermediate data file description

```
┌─SDWG (Start of a first drawing)
│ ┌─SBLOCK (Start of a first registered composite
│ │        graphic form)
│ │              POINT  ┐
│ │              LINE   │ Components
│ │               .     │
│ │               .     ┘
│ │
│ └─EBLOCK (End of the first registered composite
│          graphic form)
│                ATTR  ┐
│                TEXT  │
│                TD    ┘
│
│ ┌─SBLOCK (Start of a second registered composite
│ │        graphic form)
│ │              LINE  ┐
│ │               .    │
│ │               .    ┘
│ │
│ │       INSERT (Graphic form insertion)
│ │                ATTR ┐
│ │                TEXT │
│ │                TD   ┘
│ └─EBLOCK (End of the second registered composite
│          graphic form)
│           .
│           .
│           .
│
│ ┌─SVIEW (Start of a first element view)
│ │              POINT ┐
│ │              ATTR  │
│ │              TEXT  │
│ │              TD    ┘
│ │              CIRCLE
│ │      INSERT   .
│ │               .
│ │              ATTR ┐
│ │              TEXT │
│ │              TD   ┘
│ │               .
│ │               .
│ │ ┌─SGROUP (Start of a first general composite
│ │ │        graphic form)
│ │ │            LINE ┐
│ │ │             .   │
│ │ │             .   ┘
│ │ │
│ │ │     INSERT    .
│ │ │
│ │ │
│ │ └─EGROUP (End of the first general composite
│ │          graphic form)
│ │               .
│ │              ATTR ┐
│ │              TEXT │
│ │              TD   ┘
│ │               .
│ │               .
│ └─EVIEW (End of the first element view)
│     .
└─EDWG (End of the first drawing)
```

TABLE 3-continued

Example of intermediate data file description

```
┌─SDWG (Start of a second drawing)
│   .
│   .
└─EDWG (End of the second drawing)
```

The intermediate data file shown in FIG. 1 has the data of a first drawing and that of a second drawing, and each drawing consists of four element views.

The element view 1a of the first drawing is formed by inserting a registered composite graphic form 21 in a general composite graphic form 11. The element views 2a and 3a are a combination of general composite graphic forms 12 and 13, and a combination of general composite graphic forms 14 and 15, respectively. The element view 4a is formed by inserting a registered composite graphic form 21 indicated by broken lines in the general composite graphic form 11.

The element view 1b of the second drawing is formed by rotating a registered composite graphic form 22 by a graphic form insertion record. Similarly, the element views 2b and 3b are formed by rotating a registered composite graphic form 23 and a registered composite graphic form 24, respectively. The element view 4b is a general composite graphic form 16.

The constitution and construction of records for organizing an intermediate data file will be described in detail with reference to FIGS. 2, 3(a) and 3(b) and Table 4.

TABLE 4

|    | 1        | 50      | 100                               | 160 |
|----|----------|---------|-----------------------------------|-----|
| 1  | SDWG     |         |                                   | 6   |
| 2  | SBLOCK WAKU |      | ↑                                 | 6   |
| 3  | LINE     |         |                                   | 6   |
| .  | "        |         | First registered composite graphic form | 6 |
| .  |          |         |                                   |     |
| 9  | EBLOCK WAKU |      | ↓                                 | 6   |
| 10 | ATTR ATTR Title |  |                                   | 6   |
| 11 | TEXT     |         |                                   | 6   |
| 12 | XXXXX    |         |                                   |     |
| 13 | SBLOCK ENN |       | ↑                                 | 2   |
| 14 | CIRCLE   |         | Second registered composite graphic form | 2 |
| 15 | EBLOCK ENN |       | ↓                                 | 2   |
| 16 | SBLOCK SPLN |      | ↑                                 | 4   |
| 17 | PLINE    |         | Third registered composite graphic form | 4 |
| .  | "        |         |                                   | 4   |
| 24 | EBLOCK SPLN |      | ↓                                 | 4   |
| 25 | SVIEW A  |         |                                   |     |
| 26 | TEXT     |         |                                   | 1   |
| 27 |    VIEW: A |       |                                   |     |
| 28 | INSERT WAKU |      |                                   | 2   |
| 29 | ATTR ATTR Title |  |                                   | 6   |
| 30 | TEXT     |         |                                   | 6   |
| 31 |    NSCFF: Nippon Steel Corp. | | |     |
| 32 | EVIEW A  |         |                                   |     |
| 33 | SVIEW B  |         |                                   |     |
| 34 | TEXT     |         |                                   | 1   |
| 35 |    VIEW: B |       |                                   |     |
| 36 | SGROUP Spherical mark |  | ↑                           | 2   |
| 37 | INSERT ENN |       |                                   | 2   |
| 38 | INSERT SPLN |    | General composite graphic form     | 4   |
| 39 | ARC      |         |                                   | 2   |
| 40 | ARC      |         |                                   | 2   |
| 41 | EGROUP Spherical mark |  | ↓                           | 2   |
| 42 | ATTR GRPDAT1 type |    |                                   | 2   |
| 43 | TEXT     |         |                                   |     |
| 44 |    BALL  |         |                                   | 0   |
| 45 | DIM DIMHOR |       |                                   |     |

TABLE 4-continued

| | | | |
|---|---|---|---|
| 46 | | | 0 |
| 47 | TEXT | | |
| 48 | 2.6251 | | 1 |
| 49 | TEXT | | |
| 50 | Original view | | |
| 51 | EVIEW B | | |
| 52 | SVIEW C | | |
| 53 | TEXT | | |
| 54 | VIEW: C | | |
| 55 | SGROUP Spherical mark | ↑ | 2 |
| 56 | INSERT ENN | | 4 |
| 57 | INSERT SPLN | General composite graphic form | 2 |
| 58 | ARC | | 2 |
| 59 | ARC | | 2 |
| 60 | EGROUP Spherical mark | ↓ | 2 |
| 61 | ATTR GRPDAT2 type | | 1 |
| 62 | TEXT | | |
| 63 | BALL | | 1 |
| 64 | TEXT | | |
| 65 | Rotated view | | |
| 66 | EVIEW C | | |
| 67 | EDWG | | |

Figure 2:
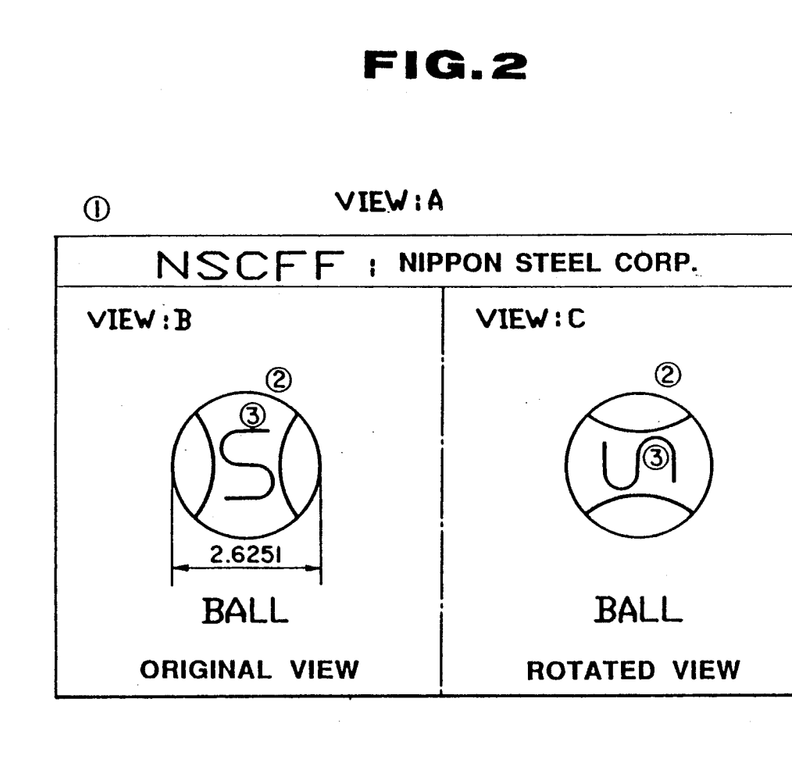
FIG. 2 is an illustration showing the contents of a concrete example of drawing data forming an intermediate data file.
Figure 3A:
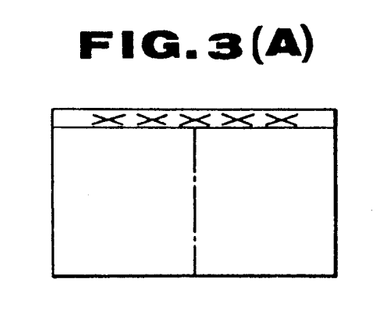
FIGS. 3(a), 3(b) and 3(c) are illustrations showing registered composite graphic forms of the contents of the drawing data of FIG. 2.
Figure 3B:
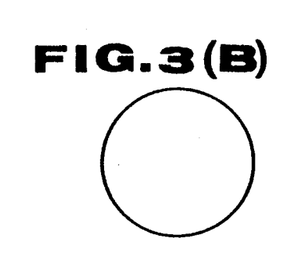
Figure 3C:
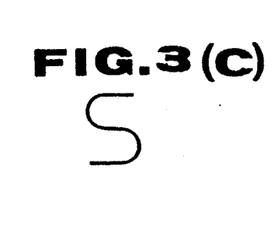

FIG. 2 shows concretely the contents and constitution of drawing data for organizing an intermediate data file, and FIGS. 3(a), 3(b) and 3(c) show the first registered composite graphic form, the second registered composite graphic form and the third registered composite graphic form, respectively. Table 4 shows data representing a sample drawing stored in an intermediate data file.

Data between SDWG in line 1 and EDWG in line 67 in Table 4 is the data base of the sample drawing shown in FIG. 2 consisting of the first, second and third registered composite graphic forms, and the three element views, i.e., VIEW: A, VIEW: B and VIEW: C. Articles in lines 2, 3 and so on are basic element records.

Data between SBLOCK in line 2 and EBLOCK in line 9, data between SBLOCK in line 13 and EBLOCK in line 15, and data between SBLOCK in line 16 and EBLOCK in line 24 are those representing the first, second and third registered composite graphic forms in the sample drawing. Data in lines 3 to 8 indicate that the first registered composite graphic form shown in FIG. 3(a) is a drawing frame consisting of six line segments.

Thus, the first requested composite graphic form is expressed in terms of the graphic form element, line segment. Data in lines 10 to 12 indicate that the drawing frame of the first registered composite graphic form has an attribute for entering the title of the drawing; data in line 10 indicates the type of the attribute; data in line 11 indicates the layout of attribute characters; and data in line 12 indicates a concrete attribute value. Data in line 14 indicates that the second registered composite graphic form FIG. 3(b) is a circle. The second registered composite graphic form is used repeatedly in an element view B (VIEW: B) by a record (INSERT) in line 37, and in an element view C (VIEW: C) by a record (INSERT) in line 56. Concretely, the second registered composite graphic form is used as both the circles of an original view and a rotated view in the sample drawing shown in FIG. 2. Data in lines 17 to 23 indicate that the third registered composite graphic form is a free curve having six peaks. The data in line 17 is graphic form information such as the number of peaks of the free curve. The data in lines 18 to 23 are concrete data of the peaks. The third registered composite graphic form is used repeatedly in the element view B (VIEW: B) by a record (INSERT) in line 38, and in the element view C (VIEW: C) by a record (INSERT) in line 57. Concretely, the third registered graphic form is a character S used in both the original view and the rotated view of the sample drawing shown in FIG. 2.

Data between SVIEW in line 25 and EVIEW in line 32 in Table 4 represent the whole of an element view A (VIEW: A) in the sample drawing shown in FIG. 2. The element view A (VIEW: A) includes TEXT data in lines 26 and 27, and data of drawing frame with an attribute in lines 28 to 31. The TEXT data in line 26 represents the concrete position and size of the characters of "VIEW: A" of FIG. 2. The TEXT data in line 27 represents the characters of "VIEW: A". The data in line 28 indicates that the first registered composite graphic form is embodied in the element view A (VIEW: A). Data in lines 29 to 31 indicate that the attribute of the element view A is "NSCFF: Nippon Steel Corp."

Data between SVIEW in line 33 and EVIEW in line 51 in Table 4 represent the whole of the element view B (VIEW: B) of the sample drawing of FIG. 2. The element view B (VIEW: B) includes TEXT in lines 34 and 35, general composite graphic form data with attributes in lines 36 to 44, dimension data in lines 45 to 48, and TEXT data in lines 49 and 50. The TEXT data in lines 34 and 35 represent the position and size of the characters of "VIEW: B" of FIG. 2. Data between SGROUP in line 36 and EGROUP in line 41 represent a general composite graphic form corresponding to the whole of a ball in the element view B (VIEW: B) of the sample drawing of FIG. 2, and include data embodying the second registered graphic form in the element view B (VIEW: B) in line 37, data embodying the third registered graphic form in the element view B (VIEW: B) in line 38, and data representing two arcs in lines 39 and 40. Data in line 42 represents information including the type of the attributes of the general composite graphic form; data in line 43 represents the layout of attribute characters; and data in line 44 indicates a concrete attribute "BALL". Actually, the characters "BALL" are entered as an attribute of the general composite graphic form in the element view B (VIEW: B) in the sample drawing of FIG. 2. Data in lines 45 to 48 represent information relating to dimensions in the sample drawing. Data in line 45 represents the type, standard and unit of the dimensioning graphic forms; data in line 46 is concrete dimensioning graphic form data; data in line 47 indicates the layout of dimensions; and data in line 48 indicates a concrete dimension. Data in lines 49 and 50 is concrete data of characters "ORIGINAL VIEW" in the element view B (VIEW: B) in the sample drawing of FIG. 2.

Data between SVIEW in line 52 and EVIEW in line 66 in Table 4 represent the whole of the element view C (VIEW: C) in the sample drawing of FIG. 2. The element view C (VIEW: C) includes TEXT data in lines 53 and 54, general composite graphic form data with attributes in lines 55 to 63, and TEXT data in lines 64 and 65. The TEXT data in lines 53 and 54 represent the characters, the size of the characters and the position of the characters of "VIEW: C" in FIG. 2. Data between SGROUP in line 55 and EGROUP in line 60 represent the general composite graphic form representing the whole of the ball in the element view C (VIEW: C) in the sample drawing of FIG. 2. The data in lines 61 to 63 indicate that the general composite graphic form is provided with an attribute "BALL", namely, the characters "BALL" are entered actually in the element view C (VIEW: C) in the sample drawing. The general composite graphic form consists of data embodying the second registered composite graphic form in the element view C (VIEW: C) in line 56, data embodying the third registered composite graphic form in the element view C (VIEW: C) in line 57, and data representing two arcs in line 58 and 59. Data in lines 64 and 65 represent concrete characters "ROTATED VIEW" in the element view C (VIEW: C) in the sample drawing.

The data, for example, in line 8 in Table 4 represents a line segment. Data representing the type of the graphic form, geometric data, data representing layer, and data representing color are entered respectively in the first to tenth columns, eleventh to 140th columns, 141st to 150th columns and 151st to 160columns. Thus, the intermediate data file organized in this embodiment expresses completely the type, geometric data, layer and color of the graphic form in a single compact record, whereas a graphic form data file of IGES expresses the graphic form attributes, such as the geometric data, layer and color of a graphic form, separately in a very complicated representation. Furthermore, although the TEXT record in lines 26 and 27, the TEXT record in lines 30 and 31 and the TEXT record in lines 47 and 48 are the same in record format, the contents of the records may be characters indicating attributes and characters indicating dimensions, respectively. Thus, the intermediate data file in accordance with the present invention is able to express various data by using a reduced number of records.

The foregoing unit records are combined properly to interpret the drawing produced by one graphic data processing system and to enter the data of the drawing in the intermediate data file, and then the contents of the intermediate data file are translated into a drawing conforming to another graphic data processing system. It is known from the following summary of the rules of entering data in the intermediate data file and interpreting the data that the graphic data conversion method of the present invention is simple and perspicuous.

The drawing data for a CAD/CAM system are arranged vertically interposing the edit partition record and the edit record between the basic element records according to the interpretation of the meaning of each drawing data. Records representing each registered composite graphic form or each general composite graphic form are placed between SBLOCK and EBLOCK or between SGROUP and EGROUP. The registered composite graphic forms are described collectively between SGROUP and EGROUP in the initial part of the intermediate data file and are repeated at the discretion of the operator as necessary by using the graphic form insertion record "INSERT". If circumstances require, the previously defined registered composite graphic forms are inserted in the another composite graphic form (e.g. general composite graphic form).

In converting the data (hereinafter referred to as "original drawing data") of a drawing produced by an original CAD/CAM system (hereinafter referred to as "source system") into those capable of being stored in the intermediate data file (hereinafter referred to as "common data"), first, records of the original drawing data are sorted, hierarchized and decomposed according to the structural rules of the intermediate data file, which includes identifying the composite graphic forms and the unit graphic forms (e.g. element views), the data are decomposed or assembled in accordance with the record specification of the intermediate data file, and then the resultant data are written sequentially in the intermediate data file as common data.

Figure 4A:
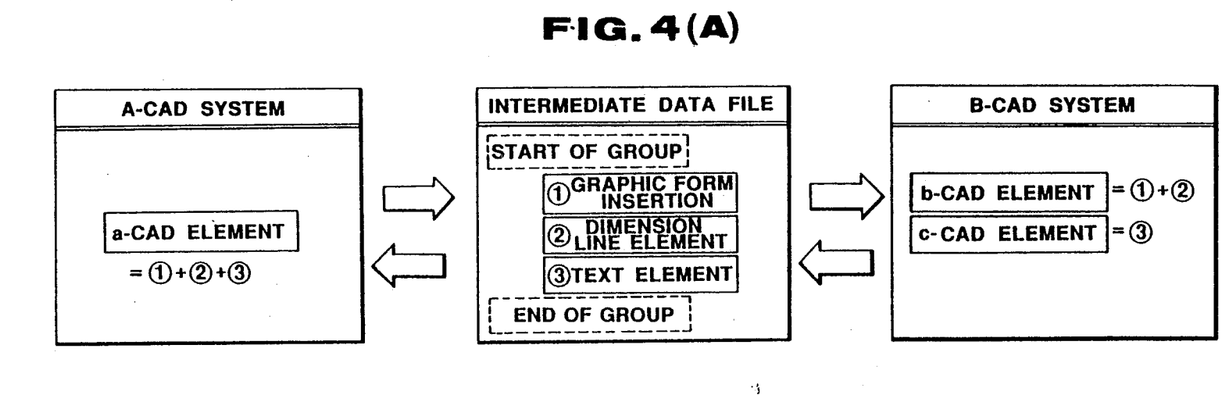
FIGS. 4A and 4B show diagram of assistance in explaining the graphic data conversion method in the first embodiment according to the present invention.
Figure 4B:
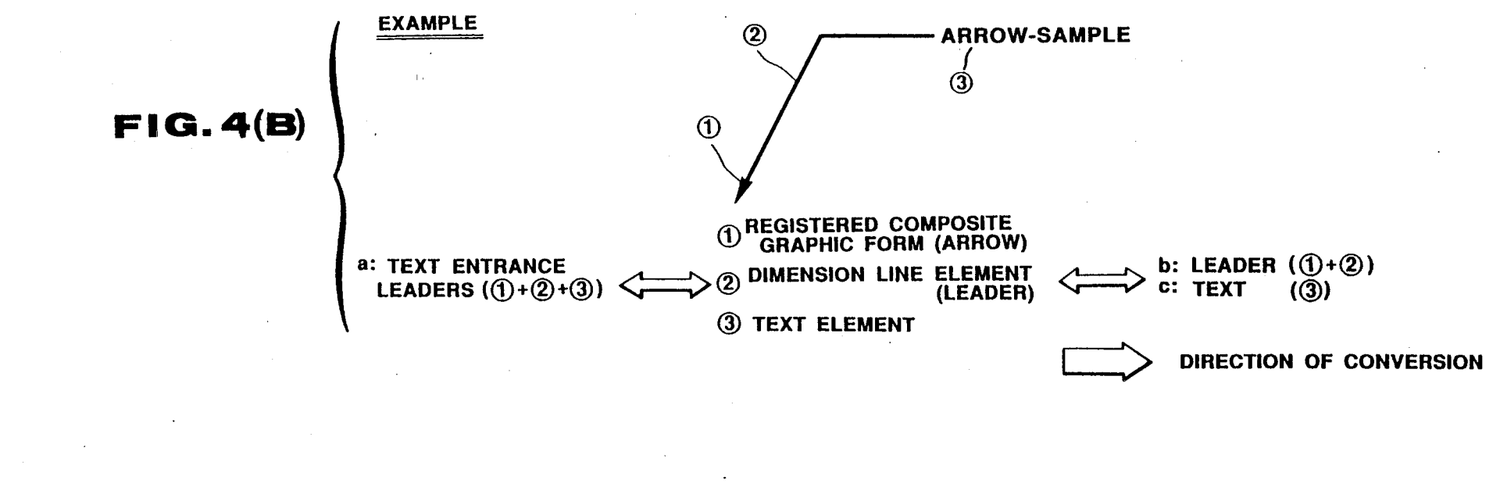

As shown in FIGS. 4A and 4B by way of example, in decomposing the original data and assembling the common data, the records and data of the original drawing are translated by discretionally combining the records stored in the intermediate data file. Even when the details of a free graphic form and the exact arrangement of texts cannot be accurately determined through simple translation, the records have parameters which enable sufficiently accurate approximation by partial adjustment of the subtle difference in the expression of the data.

In converting the common data thus organized and stored in the intermediate data file into drawing data (hereinafter referred to as "destination drawing data") capable of being processed by another CAD/CAM system (hereinafter referred to as "destination system"), the sorted and hierarchized common data stored in the intermediate data file is interpreted directly in accordance with the rules of description of the intermediate data file, is decomposed or assembled, or adjusted in accordance with the specification of the record and data of the destination system, and then the results of decomposition or assembly, or adjustment are written sequentially in the destination system as the destination drawing data. This procedure of converting the common data into the destination drawing data is the same as that of converting the original drawing data into the common data.

Since common data (graphic form data) is stored in the intermediate data file in the sequence of the records as sorted and hierarchized, the common data can be sequentially converted into the destination drawing data by reading, decomposing and assembling the common data in the order of storage without taking the trouble to interpret the common data again.

Translators for adjusting the subtle difference in function between the intermediate data file and the graphic data processing systems have the following functions.
1) Linear or circular interpolation of free curves
2) Storage of dimension lines and texts in specified layers
3) Specification of a layer and color of each line type
4) Limitation of basic element records to be provided with attributes.

Multilateral data conversion through the intermediate data file can be efficiently carried out between various different graphic data processing systems by constructing the translators for functional difference adjustment in subroutines respectively for implementing the individual functions in common to the translators respectively of different graphic data processing systems.

Furthermore, the translators of the subroutines for adjustment can be easily inspected for debugging, since the intermediate data file is so organized in a form and an arrangement that the contents thereof can be readily understood by reading.

In all cases, since the intermediate data file contains all the data common and essential to the data bases of diverse graphic data processing systems, it is possible to readily organize translators for the highly efficient and complete data conversion between optional different graphic data processing systems simply by preparing common subroutines for the adjustment of those data.

Figure 5:
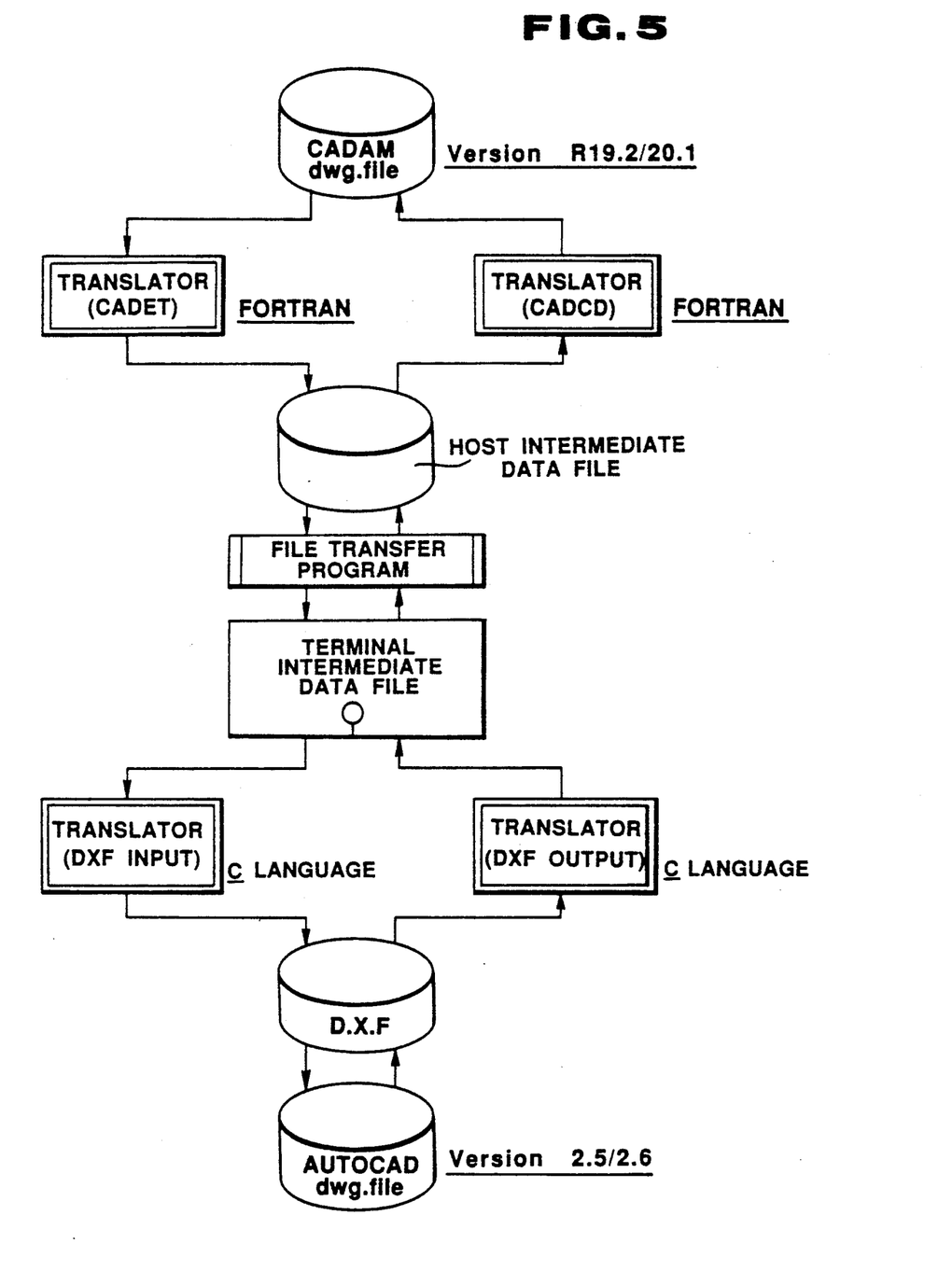
FIG. 5 is a block diagram showing the construction of a graphic data conversion system employing the graphic data conversion method of FIGS. 4A and 4B applied to bilateral graphic data conversion between the CADAM of IBM Co. and the AUTOCAD of AUTODESK Co.

The configuration of a graphic data conversion system according to the present invention for bilateral data conversion between the CADAM of IBM Co. and the AUTOCAD of AUTODESK Co. is shown in FIG. 5.

Table 5 shows the correspondence of graphic elements of the CADAM to those of the AUTOCAD in converting the graphic data of the CADAM into those of the AUTOCAD and Table 6 shows the correspondence of graphic elements of the AUTOCAD to those of the CADAM in converting the graphic data of the AUTOCAD into those of the CADAM, in which graphic elements simply corresponding to each other are omitted and only graphic elements which are different in correspondence shown in Table 5 are shown in Table 6.

TABLE 5

| No. | CADAM | Intermediate data file | AUTOCAD |
|---|---|---|---|
| 1 | Ellipse | ELLIP | Polyline (72 points, Without fit curve) |
| 2 | Elliptic arc | ELLIPA | Polyline (72 points, Without fit curve) |
| 3 | Spline | PLINE (Polyline) | Polyline (Without fit curve) |
| 4 | Mutlipolyline | PLINE (Polyline) | Polyline (Without fit curve) |
| 5 | Supertext | TEXT | Text (Decision of character start and end positions) |
| 6 | Note | TEXT | Text (Decision of character start and end positions) |
| 7 | Text | TEXT | Text (Decision of character start and end positions) |
| 8 | Ditto graphic form | INSERT | Insert graphic form |
| 9 | Arrow | SGROUP (Group header) Line 1 (Arrow line 1) Line 2 (Arrow line 2) Line 3 (Arrow head) TEXT 4 (Text of arrow) EGROUP (Group ender) | Insert graphic form (The arrow of CADAM as a registered block graphic form) |
| 10 | Balloon | SGROUP (Group header) CIRCLE 1 (Circle) TEXT 2 (Text of arrow) EGROUP (Group ender) | Insert graphic form (The arrow of CADAM as a registered block graphic form) |
| 11 | Delta | INSERT TEXT | Insert graphic form (The arrow of CADAM as a registered block graphic form) |
| 12 | Rivet | INSERT | Insert graphic form (The arrow of CADAM as a registered block graphic form) |
| 13 | Triangle | PLINE (Polyline) | Polyline |
| 14 | Section arrow | SGROUP LINE 1 INSERT 2 EGROUP | Block graphic form Insert graphic form |
| 15 | Rectangle | PLINE (Polyline) | Polyline |
| 16 | Dot | CIRCLE | Circle |
| 17 | Break line | LINE | Line (Long and three short dashes line) |
| 18 | Symbol font | Development into graphic forms | The same as the left |
| 19 | Dimension | DIMXXX | Line, Text, Insert graphic form |
| 20 | Set Graphic form | SGROUP Graphic element EGROUP | Block graphic form Insert graphic form |
| 21 | Attribute | ATTR (Attribute header) TEXT (Text attribute data) | Attributes of block graphic form |
| 22 | Detail graphic form | SBLOCK Graphic element EBLOCK | Block graphic form |

TABLE 6

| No. | AUTOCAD | Intermediate data file | CADAM |
|---|---|---|---|
| 1 | Ellipse | PLINE | Circle |
| 2 | Elliptic arc | PLINE | Circular arc |
| 3 | Polyline | PLINE | Circle, Circular arc, Straight line |
| 4 | Ring | PLINE | Two semicircles Ring diam. = (Outside diam. + Inside diam.)/2 |
| 5 | Attribute | ATTR TEXT | Attribute Write attributes in a layer AT by super text |
| 6 | Polygon | PLINE | Line |
| 7 | Dimension | LINE TEXT INSERT (Arrow of dimension) | Line, Supertext Line, Supertext |
| 8 | Trace | LINE | Line |
| 9 | Solid | LINE | Line |
| 10 | Hatch | Name of block graphic form 1 Pattern Name of insert graphic | Detail Detail |

TABLE 6-continued

| No. | AUTOCAD | Intermediate data file | CADAM |
|-----|---------|------------------------|-------|
|     |         | form 2                 |       |
|     |         | Pattern                |       |

The concrete contents of the drawing can be understood simply by sequentially reading the common data of the intermediate data file, because the records are arranged according to the structural meaning of the drawing. Accordingly, the common data is regarded as the specification of the drawing.

A common intermediate data file of common drawing data for a three-dimensional part is obtained by extending the concept of the intermediate data file.

Machining shape data of a part or a product manufactured by assembling parts obtained by machining plate-shaped works or an assembly of such works on machine tools having a low degree of freedom, such as cutting machines, boring machines and/or bending machines, is an assembly of data of a combined shape formed by three-dimensionally combining two-dimensional shapes each having a thickness. Accordingly, the intermediate data file can be extended to an extension intermediate data file as means for describing or interpreting machining procedures and the shapes of assemblies of the product, parts and works, and the specifications of the characteristics (attributes), namely, the detailed specifications for design and machining, by adding the three-dimensional coordinates of datum points of the machined shape elements, and the three-dimensional normal vectors of the machined element surfaces as the data of the basic element records to the intermediate data file.

Thus, the intermediate data file can be extended in a common intermediate data file for exchanging the graphic form and characteristics of a product or a part, or machining graphic data between different job applications for design and machining in a batch processing mode and an interactive processing mode.

Figure 6A:
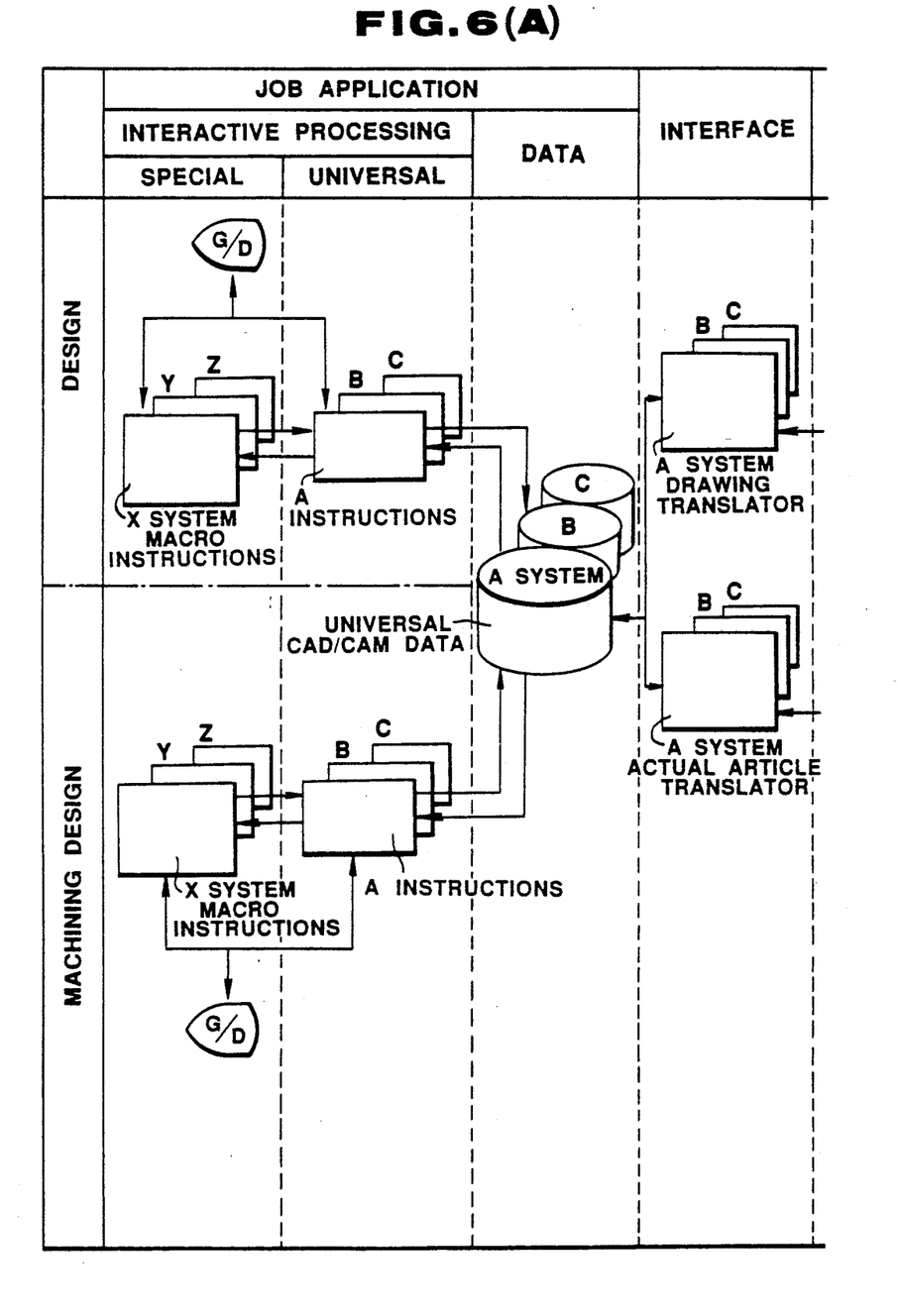
FIGS. 6A and 6B are block diagrams showing the structure of a system for the conversion of drawing data or significant data of a three-dimensional product or part between general-purpose CAD/CAM systems and job applications through an intermediate data file.
Figure 6B:
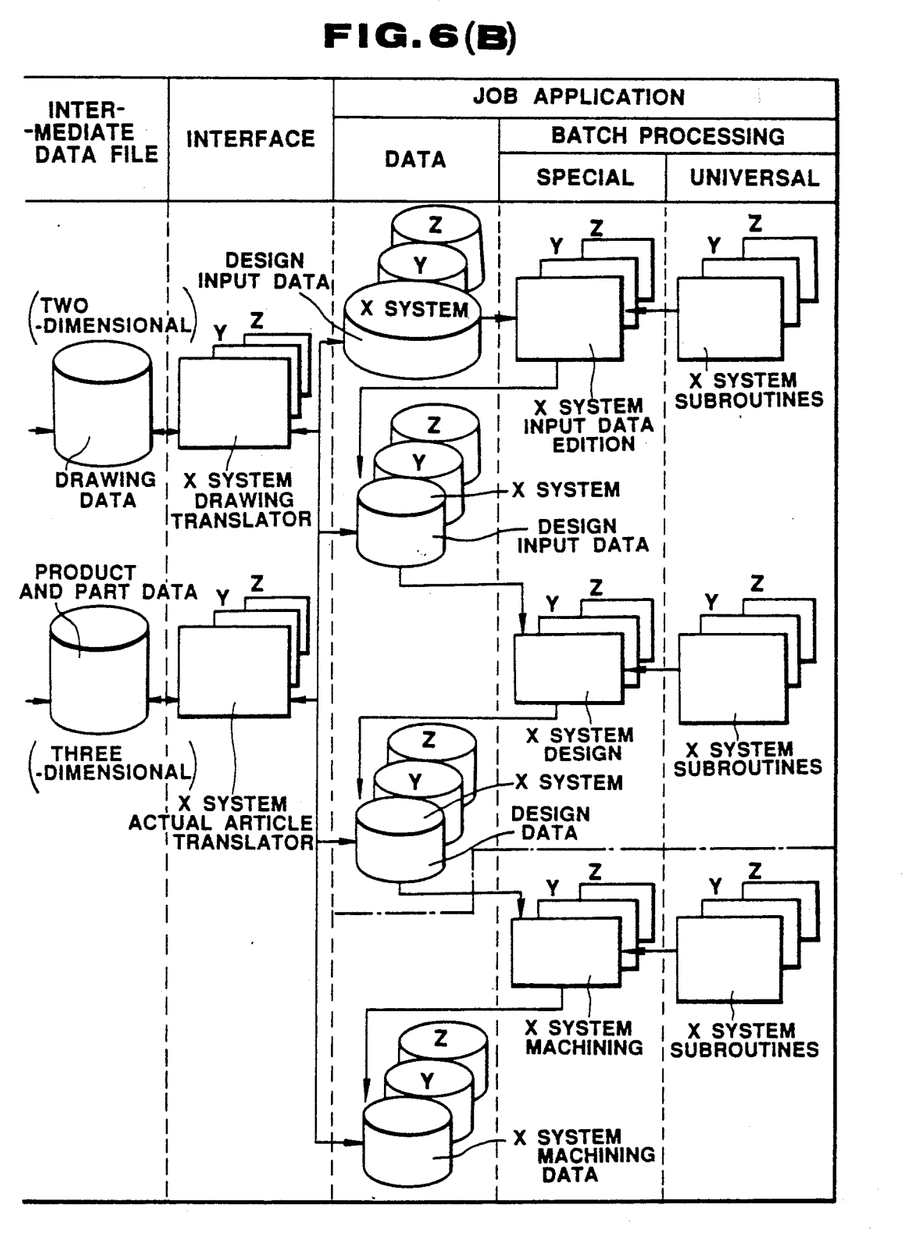

FIGS. 6(A) and 6(B) show the configuration of an exemplary system for converting and exchanging the drawing data and significant data of three-dimensional products and parts through an intermediate data file between CAD/CAM systems and job applications.

Figure 7:
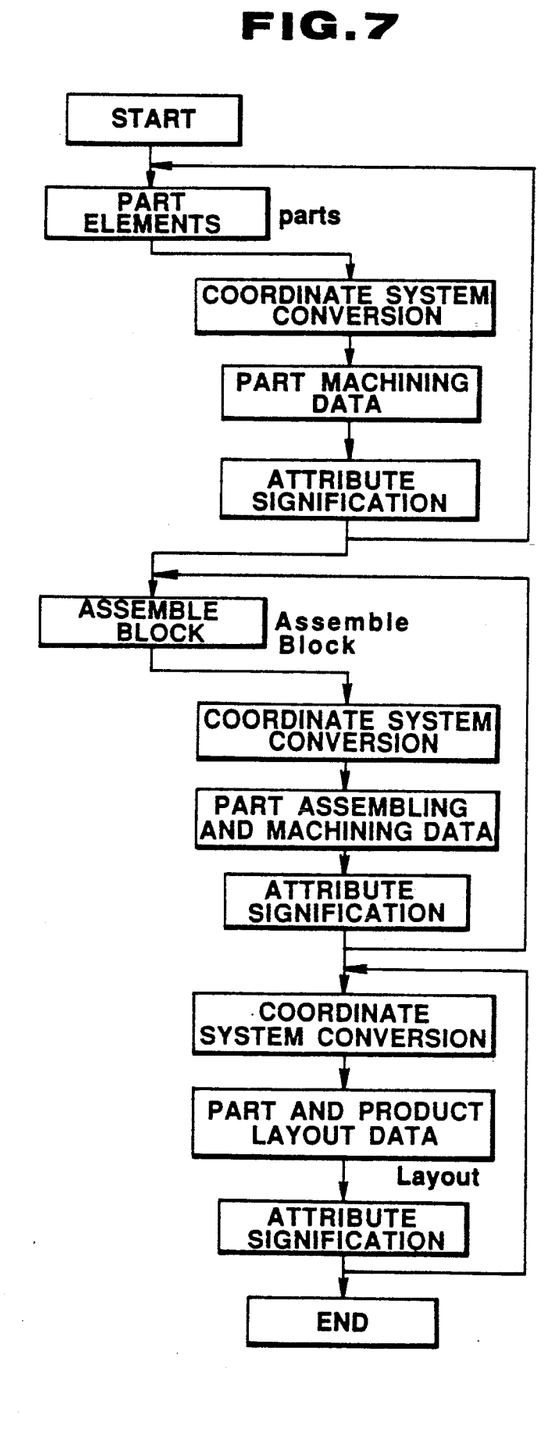
FIG. 7 is a flow diagram of assistance in explaining a procedure for writing the graphic data of a three-dimensional product of part in an intermediate data file.

FIG. 7 is a flow chart of a routine for writing the drawing data of a three-dimensional product and parts in an intermediate data file. The data base of the product and the parts of a first three-dimensional graphic data processing system is read, the product and the parts are sorted and hierarchized, the data of the product and the parts are decomposed, assembled and converted and the results of conversion are written sequentially in the intermediate data file in the steps of this flow chart.

Table 7 is the contents of the three-dimensional intermediate data file storing data written therein by the procedure defined by the flow chart of FIG. 7. All the data of the three-dimensional product is placed between S Package and E Package. "Part" represents a basic part record including the data of a coordinate system for each part. When no three-dimensional data is entered, the data of the coordinate system is the original form data of the part in the coordinate system of the part. Part data in an assembly coordinate system is placed between S Assemble and E Assemble. Assembled block product data in the coordinate system of a block product formed by assembling parts is placed between S Block and E Block. Three-dimensional parts and product layout data are placed between S Layout and E Layout. Insert records are used for repeatedly using the respective data of predefined parts, assemblies and blocks.

TABLE 7

```
─ S Package
    parts
    parts
    .
    .
    .
  ─ S Assemble
      parts
      parts
      .
      .
      .
  ─ E Assemble ─ S Block
      INSERT (Assemble) or S Assemble/E Assemble
      INSERT (Parts) or parts
      .
      .
      .
  ─ E Block
      .
      .
      .

─ S Layout
      INSERT (Block) or S Block/E Block
      INSERT (Assemble) or S Assemble/E Block
      INSERT (Parts) or Parts
      .
      .
      .
  ─ E Layout
      .
      .
  ─ E Package
```

Although not shown in Table 7, machining records, such as Cut (cutting), Hole (boring) and Bend (bending) are placed behind Parts during the machining of a part. Attributes of the parts and the product, such as the designation, are defined by placing ATTR/TEXT behind Parts, Assemble and Insert.

Figure 8:
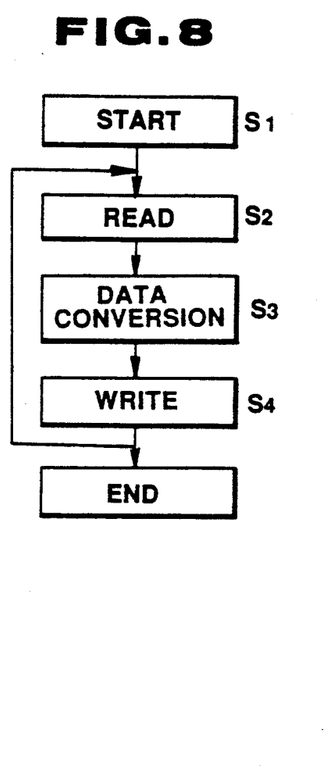
FIG. 8 is a flow chart of assistance in explaining a procedure for reading the data of a three-dimensional product of part organized by one graphic data processing system and written in an intermediate data file by another graphic data processing system.

FIG. 8 is a flow chart of a program for reading out the data written in the intermediate data file by the destination graphic data processing system.

First, the system is initialized in step $S_1$. The data stored in the intermediate data file is read out in step $S_2$. In step $S_3$, the coordinates and format of the data read from the intermediate data file are converted into those of the parts and product data of the destination three-dimensional graphic data processing system. In step $S_4$ the converted data is written in the data base of the destination three-dimensional graphic data processing system. A loop of steps $S_2$, $S_3$ and $S_4$ is repeated to read all the data stored in the intermediate data file, to convert the data and to write the converted data in the data base of the destination three-dimensional graphic data processing system.

Thus, data conversion between different CAD/CAM systems or between the job applications of the same system can be freely carried out without distinction of drawing data or product data.

EXPLOITATION IN INDUSTRY

As is apparent from the foregoing description, the graphic data conversion method of the present invention is suitable for freely and efficiently converting the graphic data of drawings or products to exchange the graphic data between different graphic data processing systems, such as CAD/CAM systems.

What is claimed is:

1. A data conversion method for converting graphic data of a first format into an intermediate format and storing the converted data in an intermediate file to facilitate subsequent conversion to a second format, the graphic data representing graphics which include a plurality of views, said data conversion method comprising the steps of:
   a. decomposing the graphic data of the first format into graphic form elements, each graphic form element being selected from a group consisting of a point, a straight line, a polyline, a circle, a circular arc, an ellipse and an elliptical arc;
   b. storing in the intermediate file at least one composite graphic form, each composite graphic form representing a plurality of portions of the graphics which portions are similar to each other, each composite graphic form including at least one graphic form element;
   c. registering the at least one composite graphic form for repeated use by storing in the intermediate file in association with each composite graphic form a corresponding symbol;
   d. converting the decomposed graphic data into unit graphic forms, each unit graphic form representing the graphics of a corresponding one of the views, the unit graphic forms being expressed in terms of the graphic form elements and the composite graphic forms, at least one of the unit graphic forms being expressed as a combination of at least one composite graphic form and at least one graphic form element, wherein each of the composite graphic forms of the unit graphic forms is represented in the unit graphic forms by the corresponding symbol; and
   e. storing the unit graphic forms in the intermediate file separately from the stored composite graphic forms.

2. A data conversion method as defined in claim 1, wherein said steps of storing the at least one composite graphic form and storing the unit graphic forms include storing the at least one composite graphic form in a first data area of the intermediate data file and storing the unit graphic forms in a second data area of the intermediate data file, further comprising the step of inserting edit partition records in the first and second data areas as dividers at beginnings and ends thereof so as to distinguish said first and second areas form each other and from any other areas of the intermediate data file and to indicate hierarchy of the data stored in the first and second data areas.

3. A data conversion method as defined in claim 2, wherein the second data area includes unit graphic drawing data areas for storing the unit graphic forms, further comprising the step of inserting respective edit partition records as dividers at a beginning and an end of each unit graphic drawing data area so as to distinguish the unit graphic drawing areas from each other and from any other area in the second data area.

4. A data conversion method as defined in claim 1, wherein said steps of storing the at least one composite graphic form and storing the unit graphic forms include storing the at least one composite graphic form in a first data area of the intermediate data file and storing the unit graphic forms in a second data area of the intermediate data file, wherein said step of storing the unit graphic forms includes the step of inserting in the second data area edit records which instruct insertion of the at least one composite graphic form on a drawing.

5. A data conversion method as defined in claim 4, wherein the step of inserting edit records includes the step of inserting, in the intermediate file, edit records indicating an operation on the inserted composite graphic form, the operation comprising at least one of inversion, rotation and stretching of the inserted composite graphic form.

6. A data conversion method as defined in claim 1, wherein the at least one composite graphic form is a plurality of composite graphic forms.

7. A data conversion method according to claim 1, wherein each portion of the graphics represented by a composite graphic form, when decomposed in said step a, comprises the same graphic form element or elements as make up the composite graphic form.

8. A data conversion method as defined in claim 1, wherein said step b includes the step of storing a plurality of composite graphic forms, each composite graphic form representing a plurality of portions of the graphics which portions are similar to each other, at least one of the composite graphic forms including a plurality of graphic form elements in a predetermined spatial relationship to each other, and said step c includes for each of the composite graphic forms the step of storing in the intermediate file in association with the composite graphic form a corresponding symbol.

* * * * *